(12) United States Patent
Gabrielyan (10) Patent No.: US 12,017,375 B2
(45) Date of Patent: Jun. 25, 2024

(54) WATERMELON CUTTING TOOL

(71) Applicant: Sos Gabrielyan, SeaTac, WA (US)

(72) Inventor: Sos Gabrielyan, SeaTac, WA (US)

(*) Notice: Subject to any disclaimer, the term of this patent is extended or adjusted under 35 U.S.C. 154(b) by 312 days.

(21) Appl. No.: 17/635,827

(22) PCT Filed: Aug. 20, 2020

(86) PCT No.: PCT/US2020/047124
§ 371 (c)(1),
(2) Date: Feb. 16, 2022

(87) PCT Pub. No.: WO2021/035016
PCT Pub. Date: Feb. 25, 2021

(65) Prior Publication Data
US 2022/0274277 A1    Sep. 1, 2022

Related U.S. Application Data

(60) Provisional application No. 62/889,197, filed on Aug. 20, 2019.

(51) Int. Cl.
*B26D 3/26* (2006.01)
*A47J 43/28* (2006.01)

(52) U.S. Cl.
CPC ............... *B26D 3/26* (2013.01); *A47J 43/28* (2013.01)

(58) Field of Classification Search
CPC . Y10S 83/932; B26D 3/26; B26D 3/24; A47J 43/28; A47J 43/18; A47J 25/00; B26B 29/063

USPC ............... 30/114, 113.1, 113.2, 113.3
See application file for complete search history.

(56) References Cited

U.S. PATENT DOCUMENTS

| | | | | |
|---|---|---|---|---|
| 3,618,208 A * | 11/1971 | Cronheim | ............... | A47J 17/04 D7/696 |
| 5,937,524 A * | 8/1999 | Hornsby | ................... | B26B 3/00 30/313 |
| 9,615,602 B2 * | 4/2017 | Watanabe | ............. | A47J 19/027 |
| 2006/0070241 A1 * | 4/2006 | Miller | ..................... | A47J 23/00 30/113.1 |
| 2013/0291387 A1 * | 11/2013 | Kerkhof | .................. | A47J 17/02 83/13 |
| 2015/0245727 A1 * | 9/2015 | Henry | ..................... | A47J 25/00 30/113.1 |

* cited by examiner

*Primary Examiner* — Phong H Nguyen
(74) *Attorney, Agent, or Firm* — DEAN A. CRAINE, P.S.

(57) ABSTRACT

A tool for cutting uniformed, conical-shaped pieces of watermelon from a whole watermelon. The tool includes a base configured to be held in a fixed, tangent position on the outside surface of a watermelon. Formed inside the base is a center opening in which a rotating adapter is placed. Formed in the adapter is a semi-circular slot with an axis diagonally aligned with the axis of rotation of the adapter when placed in the base. The tool also includes a hand piece with a handle and a lower cutting member. The lower cutting members cross-sectional shape enables it to slide through the semi-circular slot and penetrate the watermelon. The lower cutting member includes two elongated cutting edges that cut the watermelon when the hand piece and adapter are rotated 360 degrees in the base. Also disclosed is a method for making conical-shaped pieces of watermelon from a large watermelon using the tool.

8 Claims, 10 Drawing Sheets

WATERMELON CUTTING TOOL

TECHNICAL FIELD

The present invention relates. This invention pertains to cutting tools used to cut small pieces of food from a larger piece of food, and more particularly to cutting tools used to cut small pieces of watermelon from a whole or partial watermelon.

BACKGROUND ART

Watermelons are sweet, spherical-shaped fruit with smooth outer skin (called rind), interior red pulp and sweet water) juice. Although watermelons can be cut into small pieces, it is common to cut watermelons into thin, even, pie-shaped slices that can be held by hand and consumed. Users typically hold a slice of watermelon upright with their fingers.

Because watermelons are spherical and ripe from the center outward, the axial center of the watermelon has the highest concentration of sugar and the most desirable area to eat. Unfortunately, when you cut slices axially or transversely in a whole watermelon, some slices are sweeter than other slices because they are further from the axial center.

What is needed is a cutting tool for watermelons and other variety of plants from the Cucurbitaceae family with sweet edible fruit that enables users to manually cut the fruit into conical-shaped pieces that extends into the fruit's center region.

DISCLOSURE OF THE INVENTION

A watermelon cutting tool used to cut conical-shaped pieces of watermelon from a whole or partial watermelon. 1110 tool includes a base configured to be held in a fixed, tangent position on the outside surface of the watermelon. Formed inside the base is a coaxially aligned, circular opening in which an adapter is placed.

The adapter is configured to rotate 360 degrees inside the base's circular opening. The adapter includes a center portion in which it semi-circular slot is formed that extends through the adapter. The axis of the semi-circular slot is diagonally aligned with the center axis of the adapter.

The tool also includes an elongated hand piece configured to be forced into the watermelon and then rotated to cut a conical-shaped piece of watermelon. The hand piece includes an upper handle member integrally formed or selectively attached to an elongated lower cutting member. The lower cutting member includes an upper cylindrical body and a lower blade member. The upper cylindrical body is partially cut away and forms a lower abutment edge configured to rest against the top surface of the adapter when the lower blade member is inserted into the semi-circular slot. The lower blade member includes two straight alignment cutting edges that extend downward from the opposite ends of the abutment edge.

The lower section of the lower cutting member is a partially removed forming two opposite, curved, intermediate cutting edges. Extending downward from the intermediate cutting edges are long cutting edges. Each long cutting edge has compound curved shape and converges downward and rearward with the opposite cutting edge to form a narrow tip. The narrow tip is aligned directly under the rear wall of the upper cylindrical body. The overall length of the lower blade member and the angle of the semi-circular slot on the adapter are configured so when the lower blade member is forced downward into the adapter, the narrow tip on the lower blade member intersects the center axis of the adapter. When the lower blade member is rotated 360 degrees, e conical shaped piece of watermelon is formed.

BEST MODE FOR CARRYING OUT THE INVENTION

Figure 9:
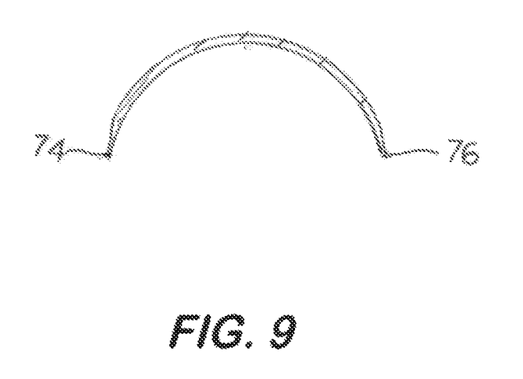
FIG. 9 is a sectional view of the cutting blade taken along line 9-9 in FIG. 8.
Figure 10:
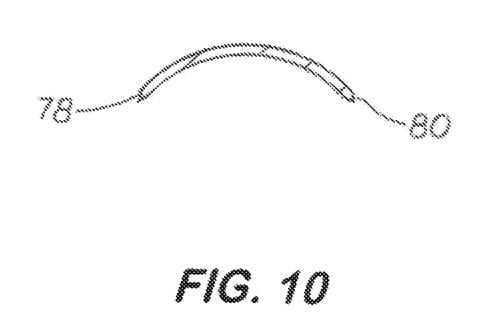
FIG. 10 is a sectional view of the cutting blade taken along line 10-10 in FIG. 8.
Figure 11:
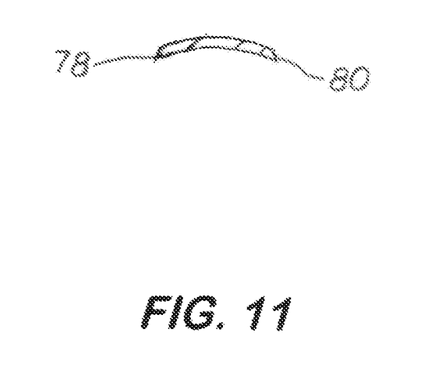
FIG. 11 is a sectional view of the cutting blade taken along line 11-11 in FIG. 8.

A watermelon cutting tool 10 used to cut conical-shaped pieces of watermelon 100 (see FIG. 9) from a whole or partial watermelon 90. The tool 10 includes a flat, ring-shaped base 15 configured to be held in a fixed, tangent position on the outside surface 92 of the watermelon 90, an adapter 25 located inside the base 15 and a hand piece 50 inserted into the adapter 25.

The base 15 includes a flat disc body 16 with a coaxially aligned, circular opening 17. Termed on the inside surface of the circular opening 17 is a circular raceway 19. Extending upward from the disc body 16 are three pin supports 20, each configured to receive an elongated pin 21. The pins 21 are inserted into the pin supports 20 and sufficient in length to extend through disc body 16 and pressed into the watermelon 90 to temporarily hold the disc body 16 in a fixed position on the watermelon 90. In the embodiment shown, the pin supports 20 which enable the user to grip the disc body more easily 16 and press the disc body 16 into the watermelon 90.

Figure 6:
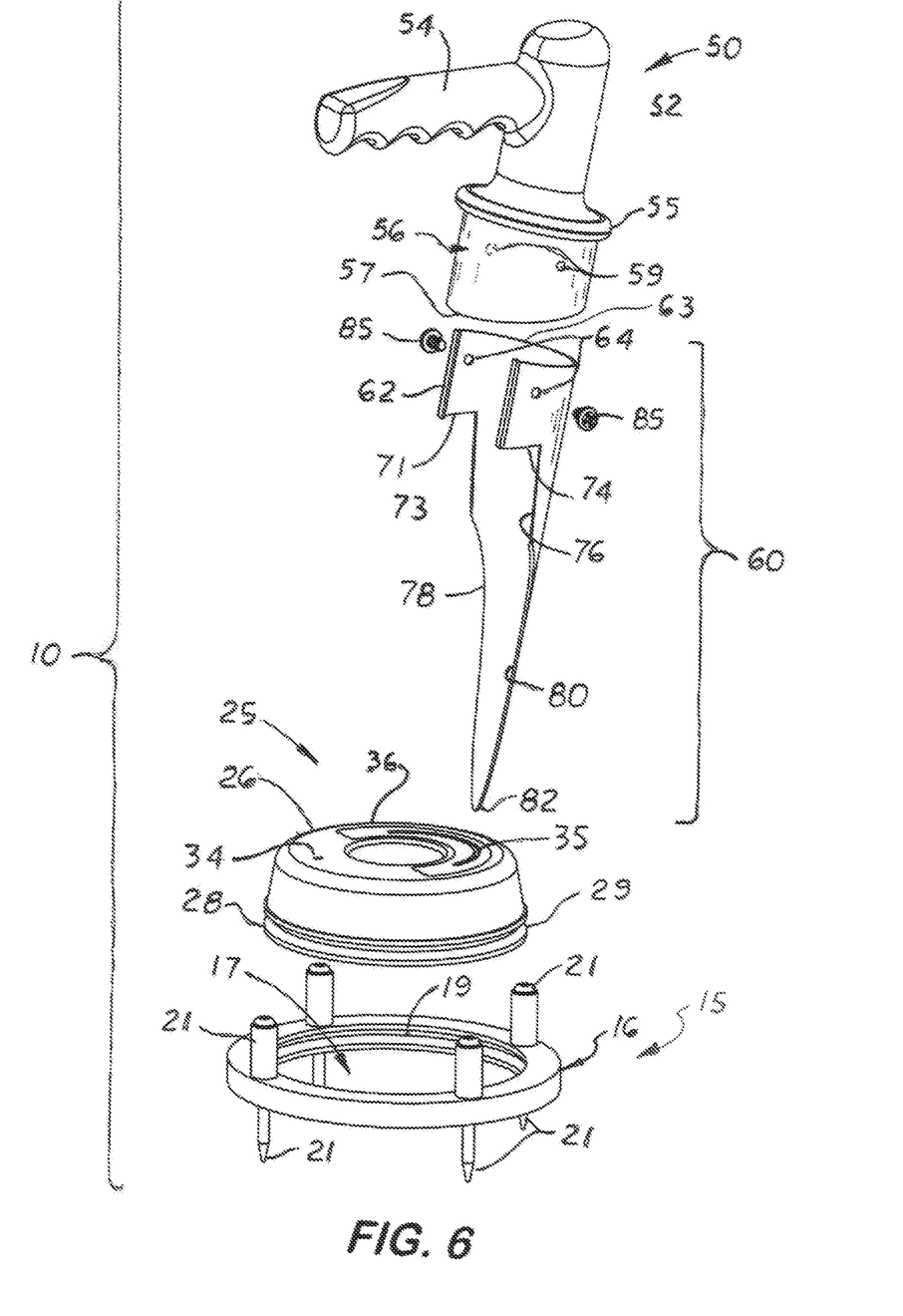
FIG. 6 is an exploded, front perspective view of the watermelon cutting tool.
Figure 8:
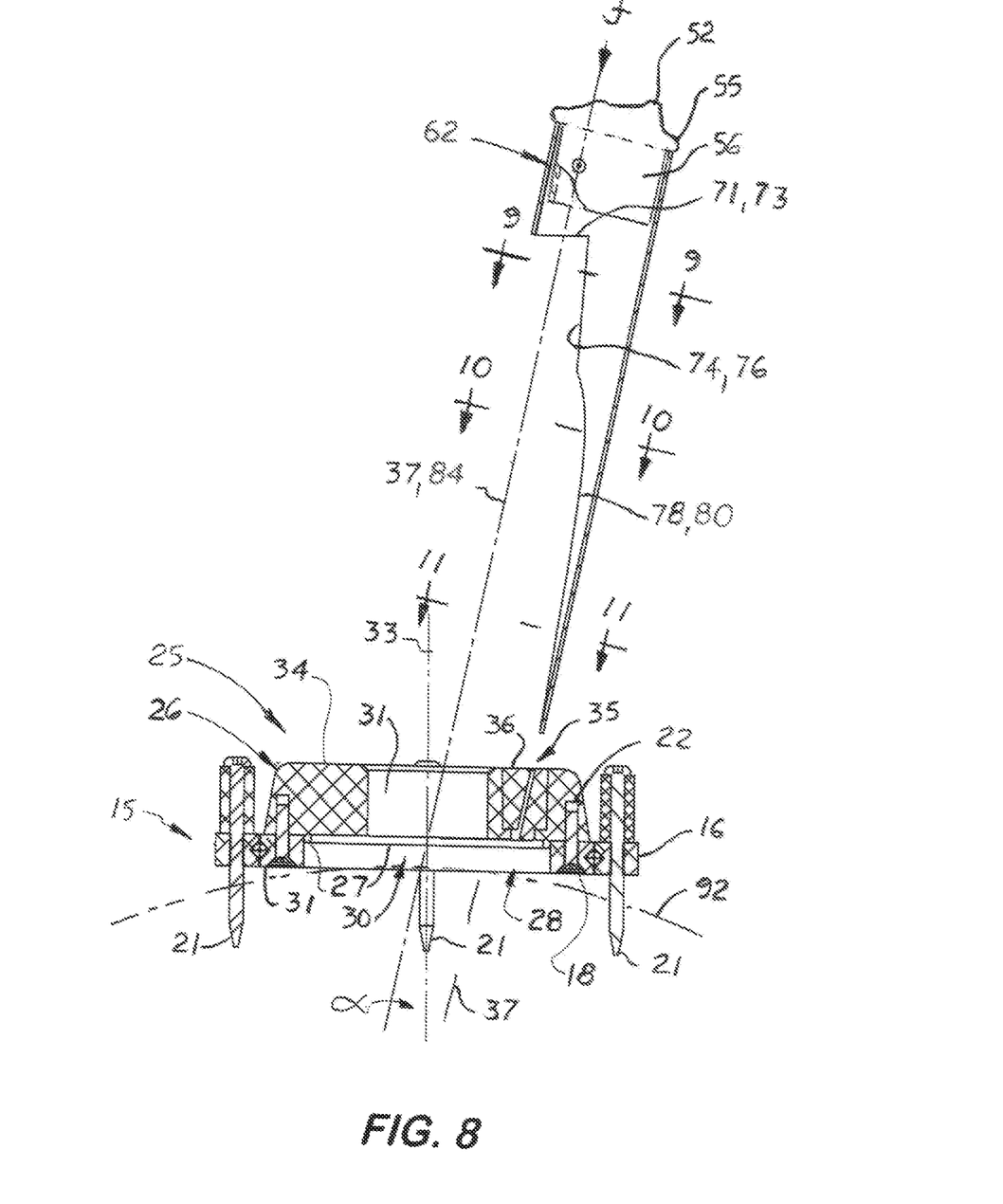
FIG. 8 is a sectional side devotional view of the base and the adapter mounted inside the base.

Located inside the circular opening 17 of the disc body 16 is an adapter 25. The adapter 25 is configured to rotate freely inside the circular opening 17 (shown more clearly in FIG. 6). As shown in FIG. 8, the adapter 25 includes an upper body 26 attached to a lower disc body 28. Formed on the upper body 26 is a center hole 31. When assembled, the upper body 26 extends above the lower disc body 28 and the disc body 16. The lower disc body 28 and the upper body 26 are connected with threaded connectors 31 (two shown in FIG. 8). The lower disc body 28 is also configured to fit inside and rotated freely in the circular opening 17 formed on the disc bods 16.

Formed on the lower disc body 28 is a center hole 30 that receives an optional downward extending neck 27 formed on the lower surface of the upper disc body 26. The neck 27 fits snuggly into the center hole 30 to axially aligned the upper body 26 over the lower disc body 28. The diameter and height of the center hole 30 is sufficient to allow the spherical outside surface 92 of a watermelon to partially extend into the center hole 30 to allow the disc body 16 to be affixed securely to the outside surface of a watermelon 92 as shown in FIG. 8.

Formed on the outer edge of the lower disc body 28 is a raceway 29. During assembly, the lower disc body 28 is inserted into the circular opening 17 and a ring bearing 32 is inserted between the two raceways 19 and 29 with allow the adapter 25 to rotated freely inside the disc body 16. The ring bearing 12 which allows the two raceways 19, 29 also help hold the adapter 25 on the disc body 16.

Formed thereon and extending from the top surface of the adapter 25 to the bottom surface of the adapter 25 is a semi-circular slot 35. The center axis 37 of the semi-circular slot 35 extends inward and is aligned diagonally approximately 12.5 degrees from the rotational or center axis 33 of the adapter 25, (see FIG. 8). In the embodiment shown herein, the semi-circular slot 35 is formed on a U-shaped insert 36 that fits a complementary U-shaped insert opening formed on the adapter 25. The insert 36 may exchanged with other inserts that have semi-circular slots 35 diagonally aligned at different angles to the rotational axis 33 of the adapter 25 thereby enabling the user to make different size conical shaped pieces 300 of watermelon. When the adapter 25 is manually rotated 360 degrees over the base 15, the semi-circular slot 35 rotates 360 degrees around the adapter's rotational axis 33.

Figure 12:
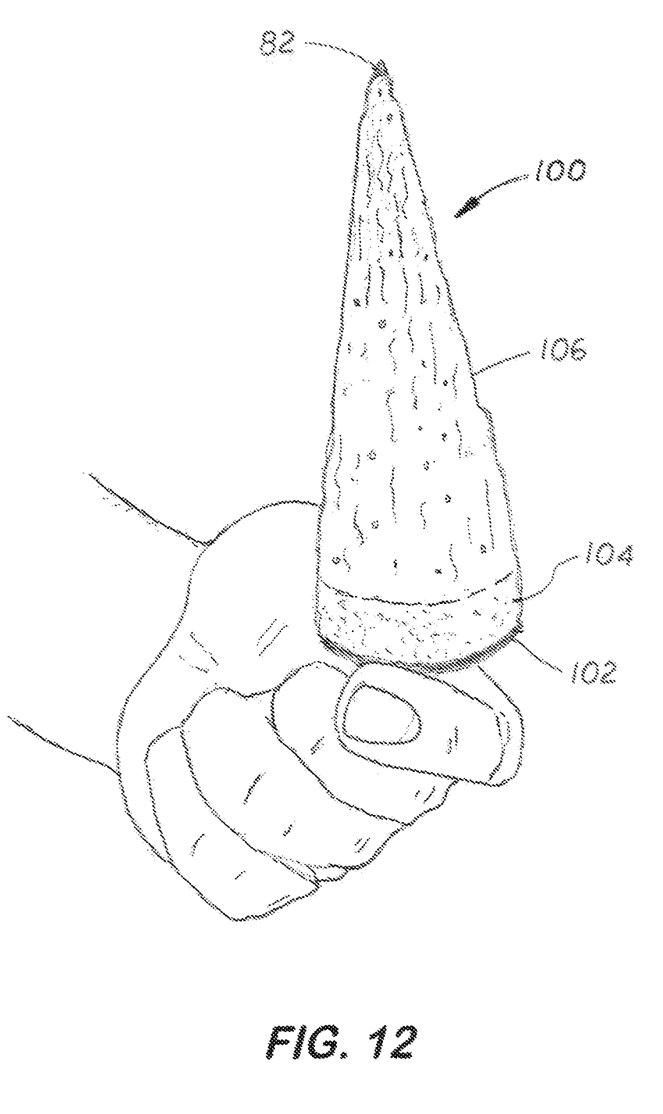
FIG. 12 is an illustration showing a user holding a conical-shaped piece of watermelon formed cut from a watermelon using die watermelon cutting tool.

The cutting tool 10 also includes an elongated hand piece 50 configured to be manually forced into the adapter 25. The adapter and hand piece 50 are then manually rotated inside the disc body to cut a conical-shaped piece 100 of watermelon 90 shown in FIG. 12. The hand piece 50 includes an upper handle member 52, a circular stop collar 55 and a cylindrical lower insert member 56. Attached to the upper handle member 53 is an optional hand grip 54.

Below the upper handle member 52 is a lower cutting member 60 that includes a cylindrical upper collar 62 and a lower blade member 70. The upper collar 62 includes a top opening 63 configured to receive the lower insert member 56. During assembly, the upper collar 62 extends around the cylindrical upper collar 62. The top edge of the upper collar 62 abuts the stop collar 55 to limit its upward movement on the handle member 52. Holes 59, 64 are formed on the upper collar 62 and the lower insert member 56, respectively, that received screws 85 to attach the upper collar 62 to the lower insert member 56.

The lower blade member 70 extends axially under the upper collar 62. The lower blade member 70 is partially cylindrical with relatively thin sidewalk (approximately 0.5 to 1.5 mm thick). The transverse, cross-section shape and size of the lower blade member 70 is configured so that the entire lower blade member 70 may slide freely into the semi-circular slut 35 formed on the adapter 25.

Figure 7:
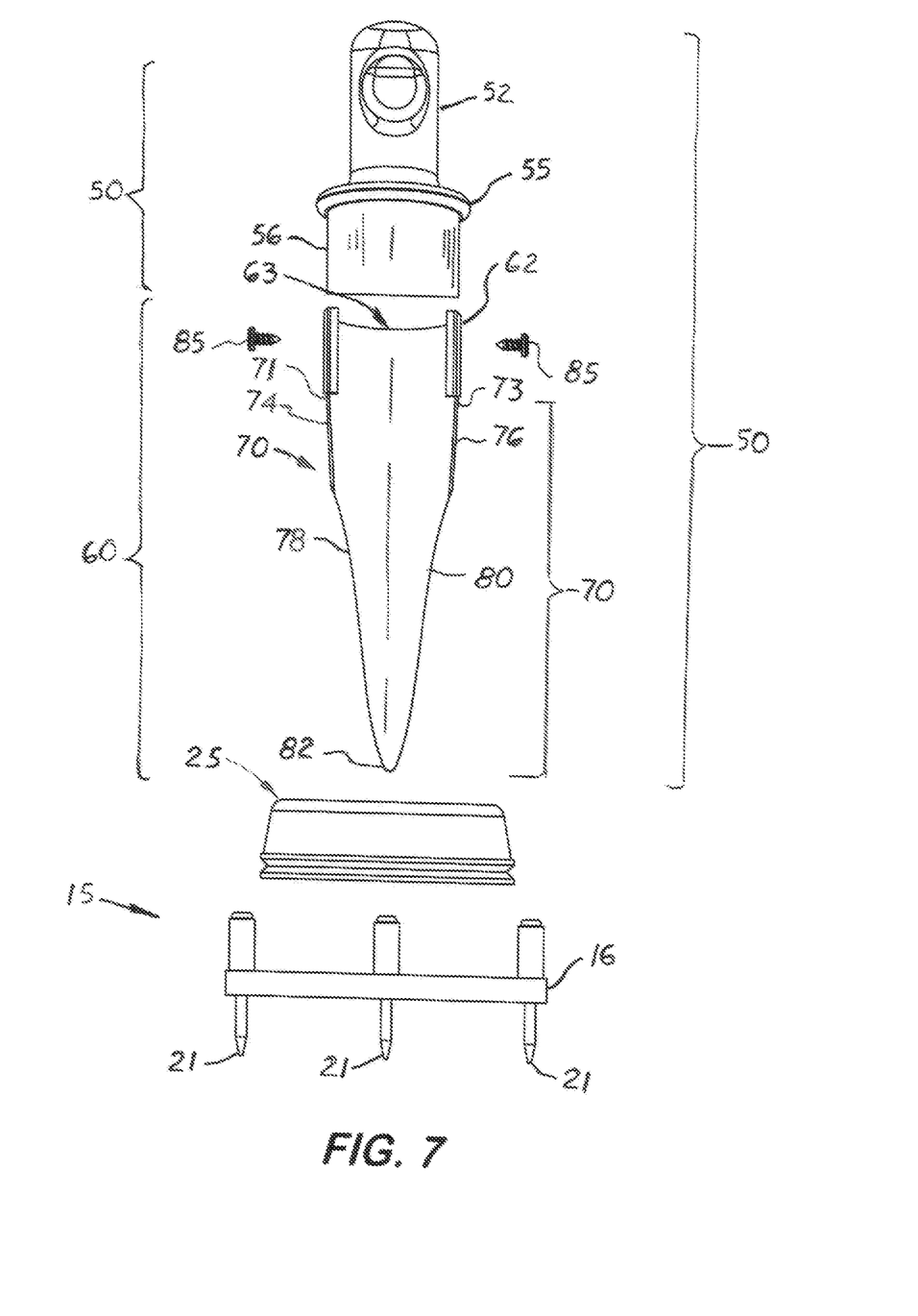
FIG. 7 is an exploded, front elevational view of the watermelon coning tool shown in FIG. 6.

As shown in FIGS. 7 and 8, the lower blade member 70 includes two transversely aligned alignment edges 71, 73 near the upper collar 62 that curve rearward and intersect two downward extending intermediate cutting edges 74, 76, respectively. During use, the alignment edges 71, 73 press against the top surface 34 of the adapter 25 and limit the downward movement of the hand piece 50 on the adapter 25.

The intermediate cutting edges 73, 76 are relatively straight and extend downward at a slight angle relative to the longitudinal axis of the lower blade member 70. The intermediate cutting edges 73, 76 are designed to easily penetrate the skin, the rind, and the flesh of a watermelon 90 when the hand piece 50 is pressed into the adapter 25. The immediate cutting edge 73, 76 are also chamfered or beveled so that they cut through the skin, rind and flesh when the hand piece 50 and the adapter 25 are rotated in the disc body 16. Extending downward from the immediate cutting edges 73, 76 are two long cutting edges 78, 80. Each long cutting edge 78, 80 is smooth, and convex with multiple radii (similar to a "french curve"). The two cutting edges 78, 80 bend inward and converge to form a narrow, relatively sharp tip 82. As shown in FIG. 8, the intermediate cutting edges 74, 76, and long cutting edges 78, 80 extend rearward from the longitudinal axis 84 (see FIG. 8) so the narrow tip 82 is axially aligned with the rear outer edge of the lower blade member 70.

FIGS. 9-12 are three sectional views of the long blade member 70 at different locations. The lone blade member 70 has a uniform diameter along its entire length but the arch lengths of the long blade member 70 are reduced and terminate at the narrow tip 82.)

During use, the upper handle member 52 is pressed into the adapter 25 so that the alignment edges 71, 73 on the lower blade member 70 is forced against on the top surface 34 of the adapter 25. The lower cutting member 70 is extends fully into semi-circular slot 35. The width of the sidewalk of the lower cutting member 70 is slightly smaller than the width of the slot 35 and the tolerances of the curves of the tower cutting member 70 and the semicircular slot 35 are minimal so that hand piece 50 and the adapter 25 become temporarily locked together enabling them to rotate as a single structure with little or no wobble.

Figure 1:
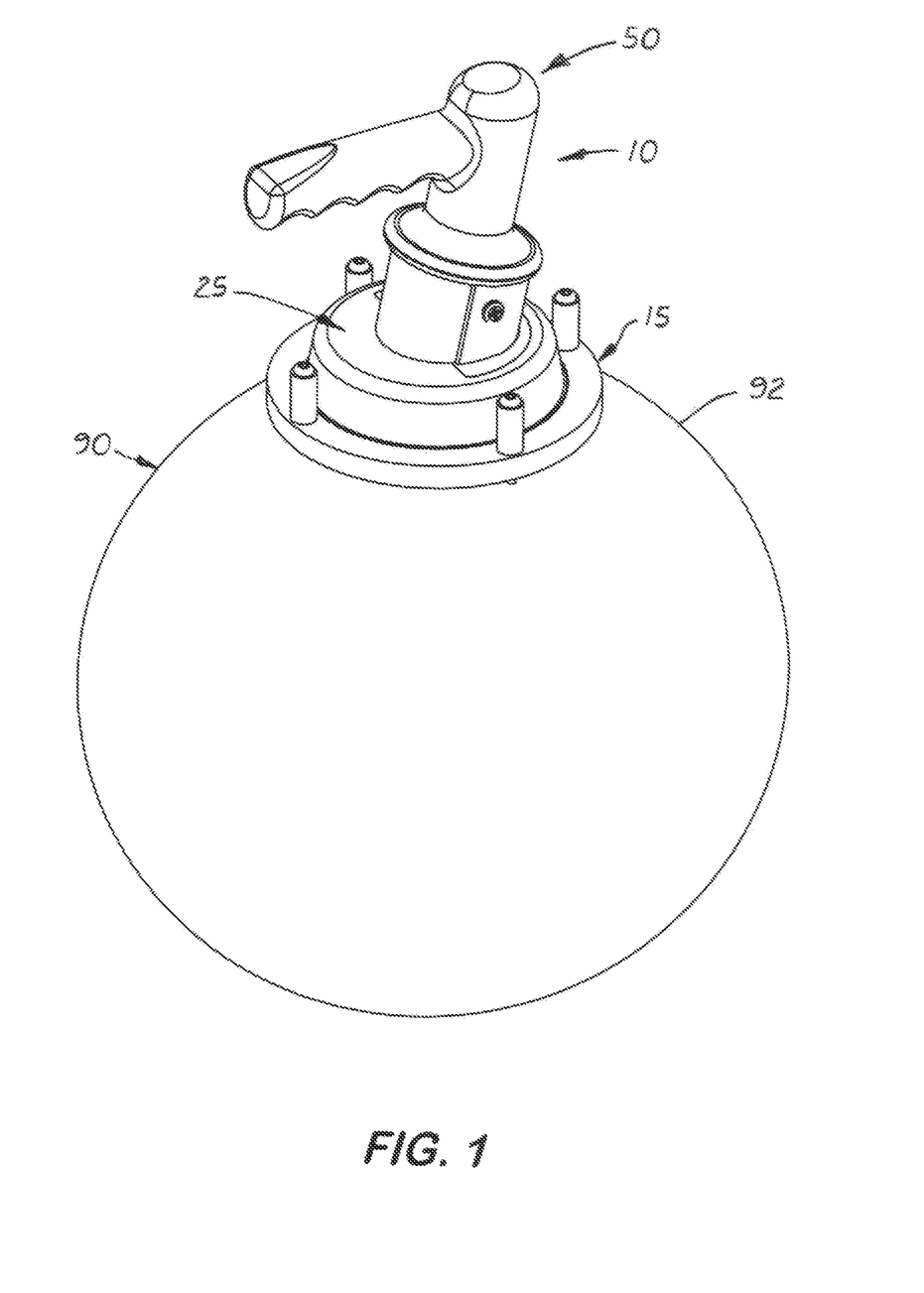
FIG. 1 a front perspective view of a watermelon cutting tool mounted on the outside surface of a watermelon.
Figure 2:
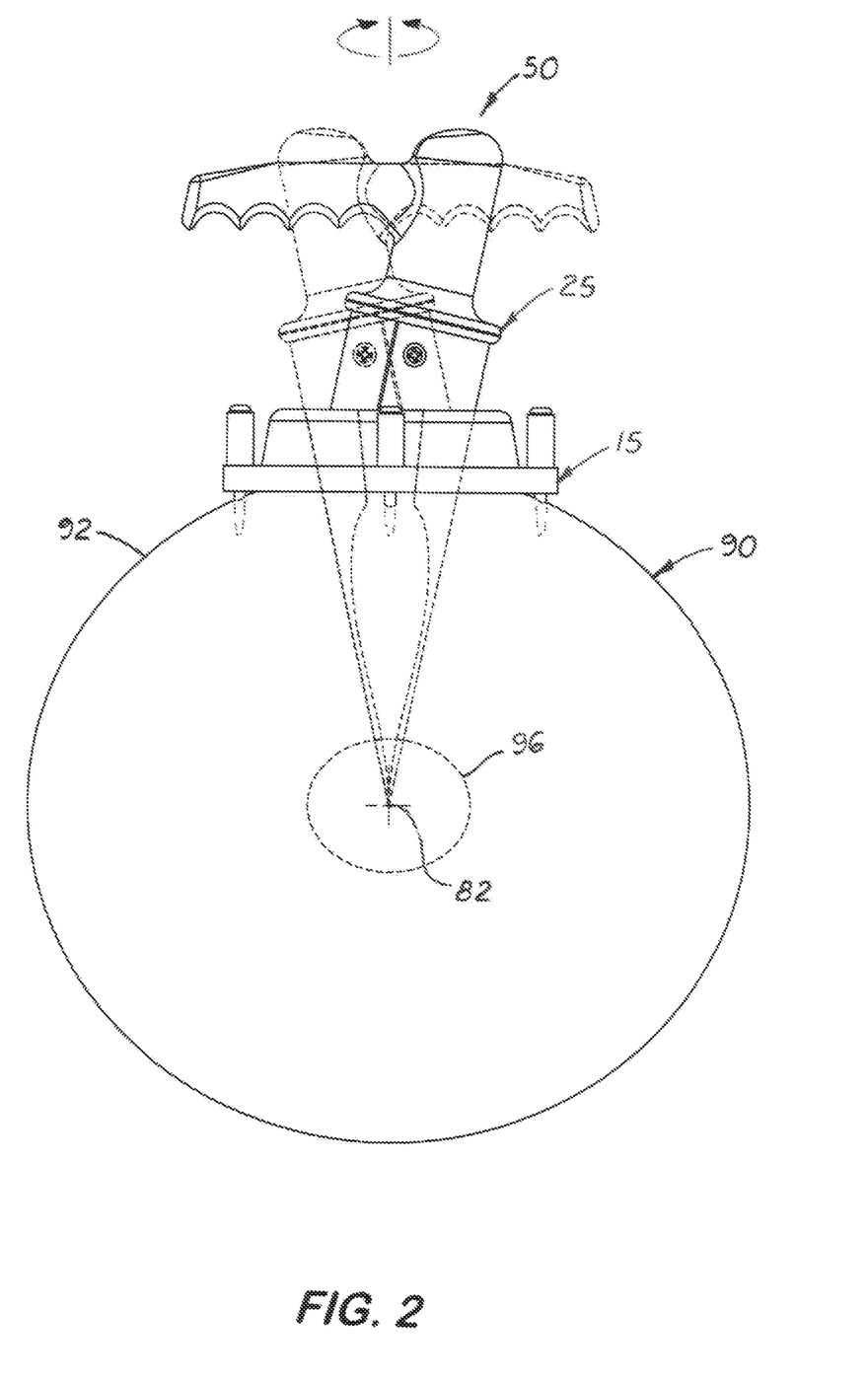
FIG. 2 is a side elevational view of the watermelon cutting tool mounted on the watermelon shown in FIG. 1.
Figure 3:
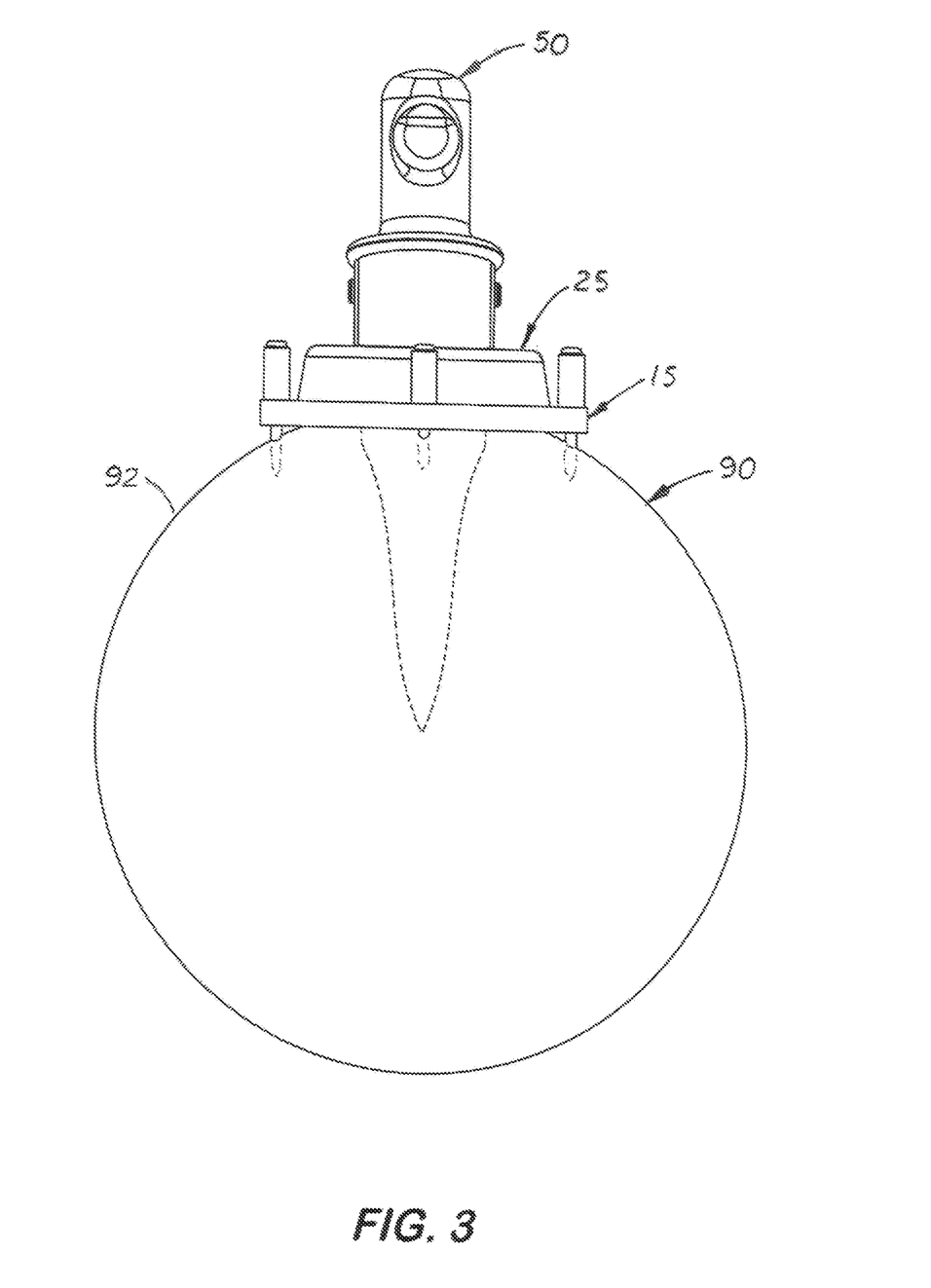
FIG. 3 is a front devotional view of the watermelon carting tool mounted on the watermelon shown in FIG. 1.
Figure 4:
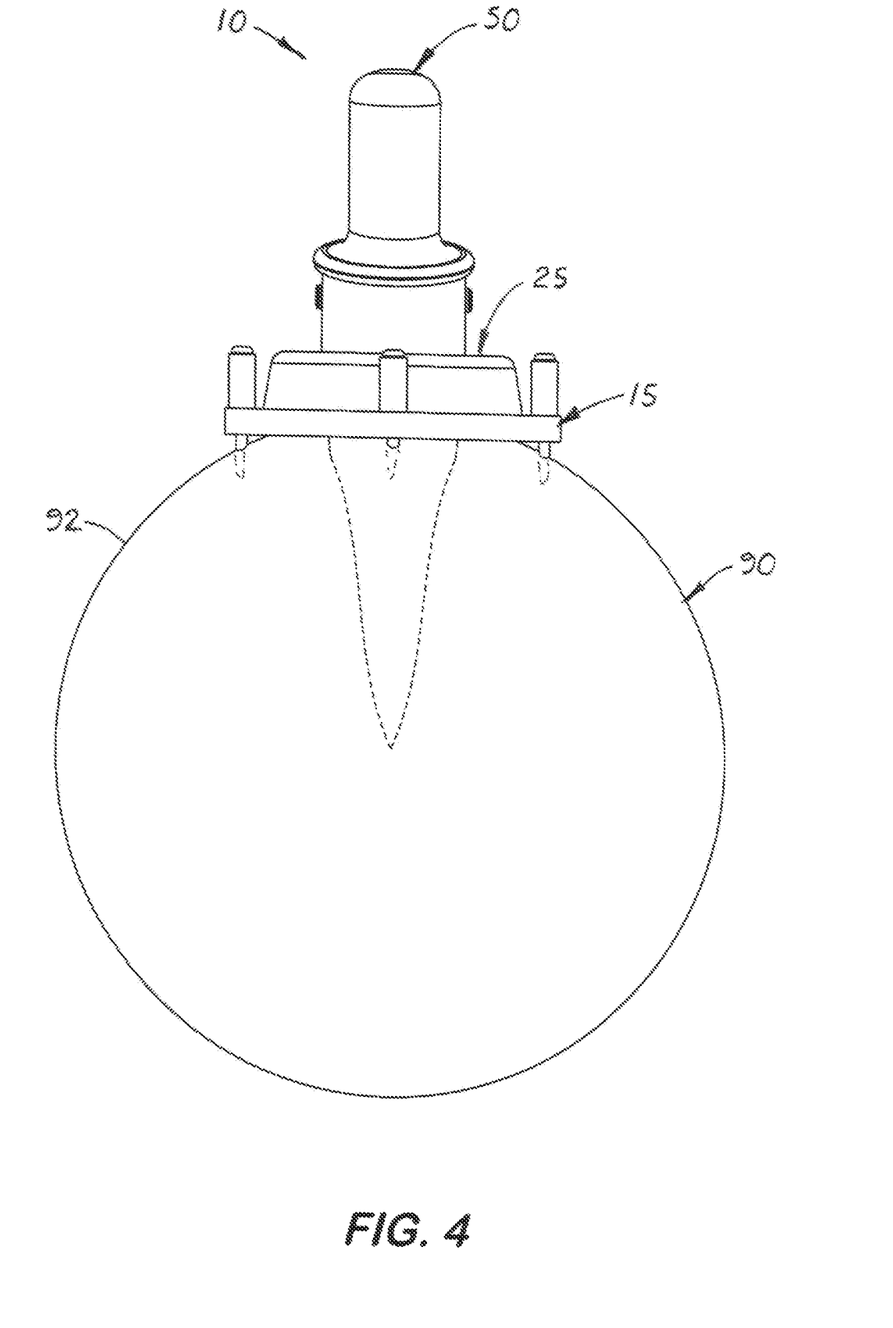
FIG. 4 is a rent elevational view of the watermelon cutting tool mounted on the watermelon shown in FIG. 1.
Figure 5:
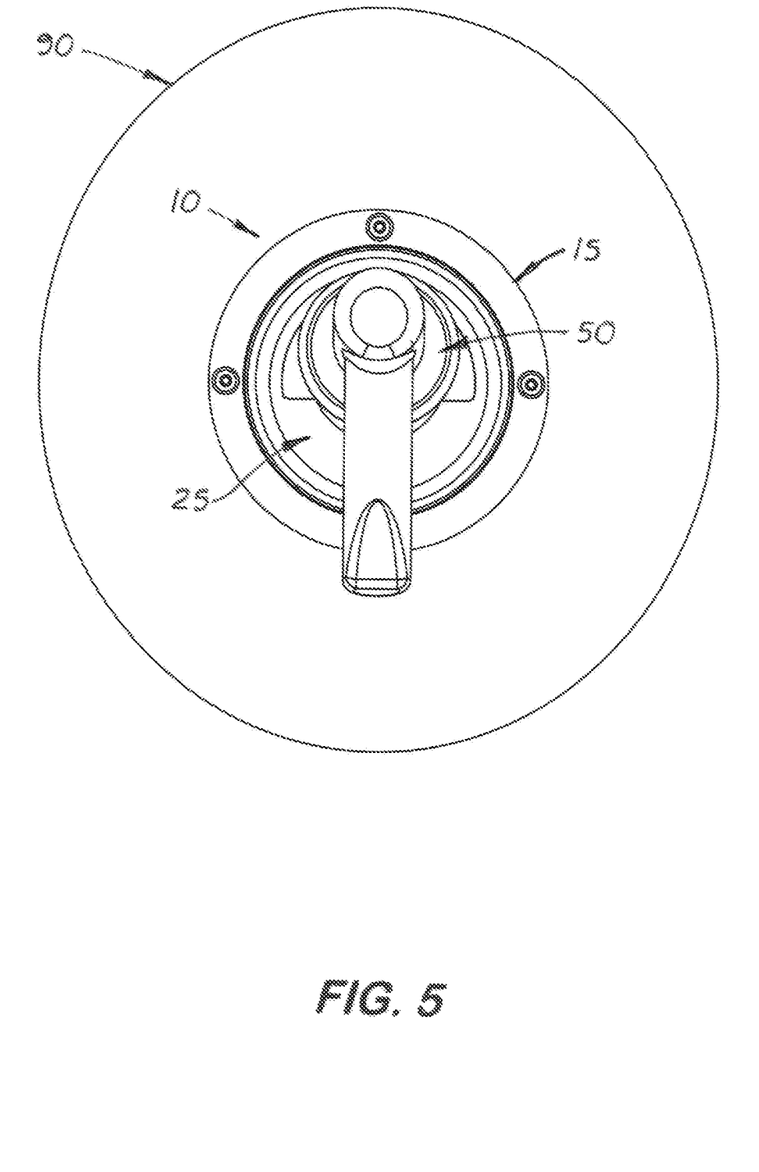
FIG. 5 is a top plan view of the watermelon cutting tool mounted on the watermelon shown in FIG. 1.

In the embodiment shown, the length of the portion of the lower blade member 70 that extends downward below from the adapter 25 and the angle of the semi-circular slot 35 formed on the adapter 25 are configured so the narrow tip 82 when inserted into a watermelon 90 intersects the extended rotational and center axis 33 of the adapter 25 when positioned tangentially on the outside surface of the watermelon 90. The length of the lower blade member 70 is also sufficient so the narrow tip 82 extends into the more juicy, center region 96 of the watermelon 90 as shown in FIG. 2.

In the embodiment shown in the Figs, the disc body 16 is approximate ½ inch thick and 4 inches in diameter. The center opening 17 on the disc body 16 is approximately 3 inches in diameter. The pins 21 are evenly spaced apart on the disc body 16 and each pin 21 is approximately ⅛ inch in diameter and 2 inches in length.

The adapter 25 is approximately 3 inches in diameter and approximately 1 inch thick.

The hand piece's cylindrical body 62 has a diameter between 1 to 3 inches (approximately 2 inches shown) and the length of the lower blade member 70 is between 4 to 8 inches (approximately 6 inches shown). The length of the hand piece 50 is between 1 to 3 inches. When used on a 12-inch diameter watermelon 90, thirty-five to forty conical-shaped pieces of watermelon 100 may be cut.

The thickness of the edges 73, 76, and 78, 80 on the lower blade member 70 is approximately 0.031 inches (8 mm) thick. The semi-circular slot 35 is approximately 0.06 inches (1.5 mm) wide. The ends of the slot 35 form a chord segment or are of approximately 180 degrees.

The sizes of the components that make up the tool 10 used in the tool 10 are not limited to the dimensions expressed above. For example, in the embodiment shown, the upper collar 62 on the lower cutting member 60 is approximately 2 inches in diameter. The diameter of the upper collar 62 may be reduced to 0.5 inch or increased to 3 inches. Also, tire length of the lower cutting member 60 may be adjusted based on the angle of the semi-circular slot 35 relative to the adapter's center axis 33. The angle of the semi-circular slot 35 relative to the center axis 33 may vary from 5 degrees to 20 degrees.

During use, the base 15 is positioned on the outside curved surface 92 of a watermelon 90. The base 15 is positioned tangentially on the watermelon 90 and pressed inward so the lower portions of that pins 21 that extend below the base 15 penetrate the watermelon 90 and securely hold the base 15 in a fixed position. As stated above, depending on the size of the watermelon 90, a portion of the outer surface of the watermelon 90 may extend into the lower opening 30. The narrow tip 82 of the lower blade member 70 is then inserted into the semi-circular slot 35. The lower blade member 70 is aligned with the semi-circular slot's axis and the hand piece 50 is then pressed downward forcing the lower blade member 70 into the semi-circular slot 35. The hand piece 50 is force downward until the abutment edges 71, 74 press against the top surface 34 of the adaptor 25. As the hand piece 50 being pressed downward through the slot 35, the lower cutting blade 70 extends below the adapter 25 and disc 15 and penetrates the watermelon 90. Because the semi-circular slot 35 is aligned diagonally in the adapter 25, the lower cutting blade 70 follows the axis 37 of the semi-circular slot 35 and penetrates the watermelon 90 at the same angle.

The user then uses the upper handle member 52 to simultaneous rotate the hand piece 50 and the adapter 25 inside the base 15. As the handle member 52 and the adapter 25 are rotated as a unit the cutting edges 73, 76 and 78, 80 on the lower cutting section 70 cut through the skin, rind and flesh of watermelon 90. Because the axis of the lower cutting section 70 aligned with the axis 37 of the semi-circular slot 35 and is diagonally aligned to the axis of rotation of the adapter 25, the lower cutting section 70 forms a conical-shaped piece of watermelon 100 shown in FIG. 12.

After forming a conical-shaped piece of watermelon 100, the base 15 and the adapter 25 are then removed from the watermelon 90. The base 15 is then repositioned at a different location on the watermelon 90. The band piece 50 is then re-attached to the adapter 25 and the hand piece 50 and adapter 25 are rotated to cut another conical shaped piece of watermelon 100.

The conical-shaped piece of watermelon 100 includes a narrow outer skin layer 102, an inner layer of rind 104 and a large top flesh area 106. The tip 82 formed on the flesh layer 106 is taken from the center of the watermelon and has higher concentration of sugar.

Using the above tool and method for cutting conical shaped pieces of watermelon is provided that includes the following steps:
  a. selecting a watermelon cutting tool that includes:
    a base configured to be held in a fixed, tangent position on an outside surface of a watermelon, the base includes a circular opening and a plurality pins that extend downward from the base configured to penetrate the surface of a watermelon and temporarily hold the base over the outside surface of the watermelon;
    a rotating adapter located inside the circular opening in the base, the adapter includes a top surface, a center axis and a semi-circular slot that extends through the adapter, the semi-circular slot being diagonally aligned inward at an acute relative to the axis of the adapter; and
    a hand piece that includes an upper handle member attached to an elongated lower cutting member, the lower cutting member being configured to slide into the semi-circular slot formed on the adapter, the lower cutting member includes a lower blade member that includes two opposite, long cutting edges configured to cut the watermelon when the band piece and adapter are rotated, the two opposite long cutting edges converge and form a narrow lip, the lower cutting member being sufficient so that when the elongated lower cutting member is inserted into the semi-circular slot, the narrow tip is disposed inside the watermelon and forms a conical-shaped piece of watermelon when the adapter and the hand piece are rotated on the base;
  b. positioning the base tangentially over the outside surface of a watermelon and pressing the base inward to force the pins into the outside surface of the watermelon;
  c. inserting the lower blade member into the semi-circular slot and pressing the hand piece into the adapter;
  d. rotating the adapter and hand piece inside the base to form a conical shaped piece of watermelon; and
  e. removing the conical-shaped piece of watermelon from the watermelon.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention has application in the tools for food preparation industry. More specifically, to tools used to cut a small pieces of fruit or vegetable from a large piece of fruit or vegetable.

I claim:
1. A watermelon cutting tool, comprising:
  a. a base configured to be held in a fixed, tangent position on an outside surface of a watermelon, the base includes a circular opening and a plurality pins that extend downward from the base and configured to penetrate the outside surface of the watermelon and temporarily hold the base over the outside surface of the watermelon;
  b. a rotating adapter coaxially aligned over the circular opening formed on the base, the adapter includes a top surface, a rotational axis and a semi-circular slot that extends through the adapter, the semi-circular slot being diagonally aligned inward at an acute angle relative to the rotational axis of the adapter; and
  c. a hand piece that includes an upper handle member attached to an elongated lower blade member, the lower blade member being configured to slide into the semi-circular slot formed on the adapter, the lower blade member includes two opposite, long cutting edges configured to penetrate the watermelon when the lower blade member is placed inside the semi-circular slot and the hand piece is pressed downward into the adapter, the two long cutting edges also configured to cut the watermelon into a conical-shaped piece of watermelon when the adapter and hand piece are rotated on the base.

2. The watermelon cutting tool, as recited in claim 1, wherein the elongated lower blade member includes a cylindrical upper collar attached or integrally formed with the lower blade member, the cylindrical upper collar attaches to the upper handle member, and the long cutting edges on the lower blade member converge and form a narrow tip.

3. The watermelon cutting tool, as recited in claim 2 wherein the semi-circular slot formed on the adapter is diagonally aligned between 5 to 30 degrees from the r axis of rotation of the adapter.

4. The watermelon cutting tool, as recited in claim 1, wherein the lower blade member has a cylindrical upper collar and a lower cutting member with intermediate and lower cutting edges, the intermediate and lower cutting edges having large to small arch lengths and converge to form a narrow tip.

5. The watermelon cutting tool, as recited in claim 1, wherein the hand piece includes an insert member that attaches to a cylindrical upper collar.

6. The watermelon cutting tool, as recited in claim 1 further including a hand grip attached to the hand piece.

7. The watermelon cutting tool, as recited in claim 1 wherein the semi-circular slot formed on the adapter is diagonally aligned between 5 to 30 degrees from the axis of rotation of the adapter.

8. A method for cutting pieces of watermelon, including the following steps:

a. selecting a watermelon cutting tool that includes:

a base configured to be held in a fixed, tangent position on an outside surface of a watermelon, the base includes a circular opening and a plurality pins that extend downward from the base configured to penetrate the outside surface of the watermelon and temporarily hold the base over the outside surface of the watermelon;

a rotating adapter located inside the circular opening in the base, the adapter includes a top surface, a center axis and a semi-circular slot that extends through the adapter, the semi-circular slot being diagonally aligned inward at an acute relative to the axis of the adapter; and a hand piece that includes an upper handle member attached to an elongated lower cutting member, the elongated lower cutting member being configured to slide into the semi-circular slot formed on the adapter, the lower cutting member includes a lower blade member that includes two opposite, long cutting edges configured to cut the watermelon when the hand piece and adapter are rotated, the two opposite long cutting edges converge and form a narrow tip, the lower cutting member being sufficient so that when the elongated lower cutting member is inserted into the semi-circular slot, the narrow tip is disposed inside the watermelon and forms a conical-shaped piece of watermelon when the adapter and the hand piece are rotated on the base;

b. positioning the base tangentially over the outside surface of the watermelon and pressing the base inward to force the pins into the outside surface of the watermelon;

c. inserting the lower blade member into the semi-circular slot and pressing the hand piece into the adapter;

d. rotating the adapter and hand piece inside the base to form a conical shaped piece of watermelon; and e. removing the conical-shaped piece of watermelon from the watermelon.

\* \* \* \* \*